(12) United States Patent
Burazin et al.

(10) Patent No.: US 10,584,446 B2
(45) Date of Patent: *Mar. 10, 2020

(54) SMOOTH AND BULKY TISSUE

(71) Applicant: Kimberly-Clark Worldwide, Inc., Neenah, WI (US)

(72) Inventors: Mark Alan Burazin, Oshkosh, WI (US); Lynda Ellen Collins, Neenah, WI (US); Jeffrey Dean Holz, Sherwood, WI (US); Mark William Sachs, Appleton, WI (US); Peter John Allen, Neenah, WI (US); Kevin Joseph Vogt, Neenah, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,064

(22) Filed: Mar. 29, 2019

(65) Prior Publication Data

US 2019/0226151 A1 Jul. 25, 2019

Related U.S. Application Data

(60) Division of application No. 15/486,041, filed on Apr. 12, 2017, now Pat. No. 10,280,566, which is a
(Continued)

(51) Int. Cl.
*D21H 27/00* (2006.01)
*A47K 10/16* (2006.01)
(Continued)

(52) U.S. Cl.
CPC .......... *D21H 27/005* (2013.01); *A47K 10/16* (2013.01); *B32B 3/28* (2013.01); *B32B 29/005* (2013.01);
(Continued)

(58) Field of Classification Search
USPC ........................................................ 428/141
See application file for complete search history.

(56) References Cited

U.S. PATENT DOCUMENTS

| 593,657 | A | 11/1897 | Hodges |
| D35,928 | S | 6/1902 | Buskirk |

(Continued)

FOREIGN PATENT DOCUMENTS

| KR | 300534696 S | 7/2009 |
| KR | 300837110 S | 1/2016 |

(Continued)

OTHER PUBLICATIONS

Bolanowski Jr., S.J. et al., "Four Channels Mediate the Mechanical Aspects of Touch," The Journal of the Acoustical Society of America, vol. 84, No. 5, 1988, pp. 1680-1694.
(Continued)

*Primary Examiner* — Jacob T Minskey
(74) *Attorney, Agent, or Firm* — Kimberly-Clark Worldwide, Inc.

(57) ABSTRACT

The present disclosure provides high bulk tissue products, as well as an apparatus and methods for manufacturing the same. The tissue products provided herein not only have high bulk, but they also have improved surface smoothness, particularly compared to tissue products of similar basis weights.

8 Claims, 7 Drawing Sheets

Related U.S. Application Data continuation of application No. 14/358,961, filed as application No. PCT/US2013/072220 on Nov. 27, 2013, now Pat. No. 9,657,444.

(60) Provisional application No. 61/731,651, filed on Nov. 30, 2012.

(51) Int. Cl.

| | | |
|---|---|---|
| *D21H 27/30* | (2006.01) | |
| *D21H 11/04* | (2006.01) | |
| *B32B 3/28* | (2006.01) | |
| *B32B 29/00* | (2006.01) | |
| *D21H 27/02* | (2006.01) | |
| *D21H 27/32* | (2006.01) | |

(52) U.S. Cl.
CPC .......... *D21H 11/04* (2013.01); *D21H 27/002* (2013.01); *D21H 27/004* (2013.01); *D21H 27/02* (2013.01); *D21H 27/30* (2013.01); *D21H 27/32* (2013.01); *B32B 2250/26* (2013.01); *B32B 2307/538* (2013.01); *B32B 2307/546* (2013.01); *B32B 2307/718* (2013.01); *B32B 2307/72* (2013.01); *B32B 2555/00* (2013.01)

(56) References Cited

U.S. PATENT DOCUMENTS

| | | |
|---|---|---|
| 885,158 A | 4/1908 | Kahn |
| 1,657,784 A | 1/1928 | Bergstrom |
| D114,605 S | 5/1939 | Turpan |
| 2,325,903 A | 8/1943 | Blair et al. |
| D230,081 S | 1/1974 | Thomas |
| 3,962,763 A | 6/1976 | Jury |
| 4,154,883 A | 5/1979 | Elias |
| 5,230,776 A | 7/1993 | Andersson et al. |
| 5,628,876 A | 5/1997 | Ayers et al. |
| 5,672,248 A | 9/1997 | Wendt et al. |
| 5,702,571 A | 12/1997 | Kamps et al. |
| 5,743,999 A | 4/1998 | Kamps et al. |
| 5,904,811 A | 5/1999 | Ampulski et al. |
| D426,388 S | 6/2000 | Jahner et al. |
| 6,077,590 A | 6/2000 | Archer et al. |
| D446,616 S | 8/2001 | Denney |
| D447,299 S | 8/2001 | Denney |
| D451,656 S | 12/2001 | Denney |
| 6,423,180 B1 | 7/2002 | Behnke et al. |
| 6,613,193 B2 | 9/2003 | Wolkowicz et al. |
| 6,887,348 B2 | 5/2005 | Hermans et al. |
| 6,893,535 B2 | 5/2005 | Hermans et al. |
| D525,437 S | 7/2006 | Leisch et al. |
| 7,166,189 B2 | 1/2007 | Burazin et al. |
| 7,235,156 B2 | 6/2007 | Baggot |
| 7,294,229 B2 | 11/2007 | Hada et al. |
| 7,419,569 B2 | 9/2008 | Hermans et al. |
| 7,470,345 B2 | 12/2008 | Troxell et al. |
| 7,497,925 B2 | 3/2009 | Hermans et al. |
| 7,497,926 B2 | 3/2009 | Hermans et al. |
| D597,779 S | 8/2009 | Hoyle et al. |
| 7,611,605 B2 | 11/2009 | Burazin et al. |
| 7,726,349 B2 | 6/2010 | Mullally et al. |
| 7,799,968 B2 | 9/2010 | Chen et al. |
| 7,935,221 B2 | 5/2011 | Allen et al. |
| 7,935,409 B2 | 5/2011 | Burazin et al. |
| 7,938,932 B2 | 5/2011 | Hermans et al. |
| D655,875 S | 3/2012 | Fiumefreddo |
| D667,187 S | 9/2012 | Sowinski et al. |
| 8,341,797 B2 | 1/2013 | Young |
| D739,106 S | 9/2015 | Hoying et al. |
| D749,203 S | 2/2016 | Daniel |
| 9,468,566 B2 | 10/2016 | Rosati et al. |
| 9,474,361 B2 | 10/2016 | Filho et al. |
| 2002/0112830 A1 | 8/2002 | Bakken et al. |
| 2003/0135181 A1 | 7/2003 | Chen et al. |
| 2004/0020614 A1 | 2/2004 | Lindsay et al. |
| 2004/0200590 A1 | 10/2004 | Wilhelm |
| 2005/0145353 A1 | 7/2005 | Troxell et al. |
| 2005/0252626 A1 | 11/2005 | Chen et al. |
| 2008/0073046 A1 | 3/2008 | Dyer et al. |
| 2008/0245693 A1 | 10/2008 | Vinson |
| 2009/0094772 A1 | 4/2009 | Lee et al. |
| 2010/0024912 A1 | 2/2010 | Quigley |
| 2010/0051217 A1 | 3/2010 | Allen et al. |
| 2010/0051218 A1 | 3/2010 | Allen et al. |
| 2011/0079671 A1 | 4/2011 | Wojcik et al. |
| 2013/0068868 A1 | 3/2013 | Hermans et al. |
| 2013/0071678 A1 | 3/2013 | Shannon |
| 2013/0160960 A1 | 6/2013 | Hermans et al. |
| 2013/0199741 A1 | 8/2013 | Stage et al. |
| 2013/0299623 A1 | 11/2013 | Dollevoet et al. |
| 2015/0299963 A1 | 10/2015 | Manifold et al. |

FOREIGN PATENT DOCUMENTS

| | | |
|---|---|---|
| MX | 2012014954 A | 2/2013 |
| WO | 2008107845 A2 | 9/2008 |
| WO | 2008114155 A1 | 9/2008 |
| WO | 2011159792 A2 | 12/2011 |
| WO | 2015030750 A1 | 3/2015 |

OTHER PUBLICATIONS

BR Central Design: Pattern & Texture, web pasge http://brcentraldesign.blogspot.com/2011/04/pattern-texture.html, Apr. 3, 2011, 2 pages.
Connor, C.E. et al., "Tactile Roughness: Neural Codes that Account for Psychophysical Magnitude Estimates," The Journal of Neuroscience, vol. 10, No. 12, Dec. 1990, pp. 3823-3836.
Macro Paper Towel (Napkin) Texture, Stock Photo 22482067—Megapixl, website copyright 2016, https://www.megapixl.com/macro-paper-towel-napkin-texture-stock-photo-22482067, site visited Nov. 12, 2016, 3 pages.

SMOOTH AND BULKY TISSUE

RELATED APPLICATIONS

The present application is a divisional application of U.S. patent application Ser. No. 15/486,041, filed on Apr. 12, 2017, which is a continuation application of U.S. Pat. No. 9,657,444, filed on May 16, 2014, which is a national-phase entry, under 35 U.S.C. § 371, of PCT Patent Application No. PCT/US2013/07220, filed on Nov. 27, 2013, which claims priority to U.S. Provisional Patent Application No. 61/731,651, filed on Nov. 30, 2012, all of which are incorporated herein by reference in a manner consistent with the present application.

BACKGROUND

For rolled tissue products, such as bathroom tissue and paper towels, consumers generally prefer firm rolls having a large diameter. A firm roll conveys superior product quality and a large diameter conveys sufficient material to provide value for the consumer. From the standpoint of the tissue manufacturer, however, providing a firm roll having a large diameter is a challenge. In order to provide a large diameter roll, while maintaining an acceptable cost of manufacture, the tissue manufacturer must produce a finished tissue roll having higher roll bulk. One means of increasing roll bulk is to wind the tissue roll loosely. Loosely wound rolls however, have low firmness and are easily deformed, which makes them unappealing to consumers. As such, there is a need for tissue rolls having high bulk as well as good firmness.

Furthermore, it is desirable to provide a rolled tissue product having a high-basis-weight tissue sheet that is also soft. To provide a tissue product that is perceived as being soft, the tissue manufacturer is faced with a myriad of choices, including altering the surface topography of the tissue product so that its user perceives it as being smooth.

Although it is desirable to provide a sheet having high-basis-weight, bulk, good roll firmness, and a smooth surface, improvement of one of these properties typically comes at the expense of another. For example, as the basis weight of the tissue sheets is increased, achieving high roll bulk becomes more challenging, particularly when manufacturing uncreped through-air dried webs since much of the bulk of the tissue structure is achieved by molding of the embryonic tissue web into the paper-making fabric and this bulk is decreased by increasing the basis weight of the sheet. Hence the tissue manufacturer must strive to economically produce a tissue roll that meets these often-contradictory parameters of large diameter, good firmness, high quality sheets and acceptable cost.

SUMMARY

It has now been surprisingly discovered that forming a textured tissue product using a through-air drying fabric having a three dimensional design element results in a tissue product having high surface smoothness, low stiffness and improved bulk. Accordingly, in one aspect the present disclosure provides a single-ply tissue web having a basis weight greater than about 35 grams per square meter (gsm), a Stiffness Index from about 4 to about 8 and a geometric mean tensile (GMT) from about 700 to about 1200 g/3".

In another aspect the present disclosure provides a multi-ply tissue web having a basis weight greater than about 40 gsm, a Stiffness Index from about 4 to about 8 and a GMT from about 700 to about 1200 g/3".

In other aspects the present disclosure provides single and multi-ply tissue webs spirally wound into tissue rolls, the tissue webs having a basis weight greater than about 35 gsm, a Stiffness Index less than about 8 and a GMT from about 700 to about 1200 g/3", the rolls having a roll bulk from about 14 to about 18 cc/g and a Roll Firmness from about 8 to about 10 mm.

In still other aspects the present disclosure provides a rolled tissue product comprising a spirally wound tissue web having a sheet bulk greater than about 15 cc/g, the rolled tissue product having a Roll Structure greater than about 1.0, such as from about 1.0 to about 2.0 and in certain preferred embodiments from about 1.2 to about 1.8.

In other aspects the present disclosure provides a single-ply tissue web having a sheet bulk greater than about 15 cc/g and a Surface Smoothness S90 value less than about 105 µm.

In yet other aspects the present disclosure provides a multi-ply tissue web having a caliper greater than about 600 µm and a Surface Smoothness S90 value less than about 95 µm.

In other aspects the disclosure provides a rolled tissue product comprising a multi-ply tissue web spirally wound into a roll, the tissue web having a sheet bulk greater than about 15 cc/g, Surface Smoothness Sa value less than about 95 µm and a Surface Smoothness Sq value less than about 30 µm.

In still other aspects the present disclosure provides a tissue web having a basis weight greater than about 38 gsm, a sheet bulk greater than about 15 cc/g and a Surface Smoothness S90 value less than about 105 µm.

In other aspects the present disclosure provides a tissue web having a basis weight greater than about 38 gsm, a sheet bulk greater than about 15 cc/g, a Surface Smoothness Sa value less than about 25 µm, a Surface Smoothness Sq value less than about 40 µm and a Surface Smoothness S90 value less than about 105 µm.

DEFINITIONS

Figure 1:
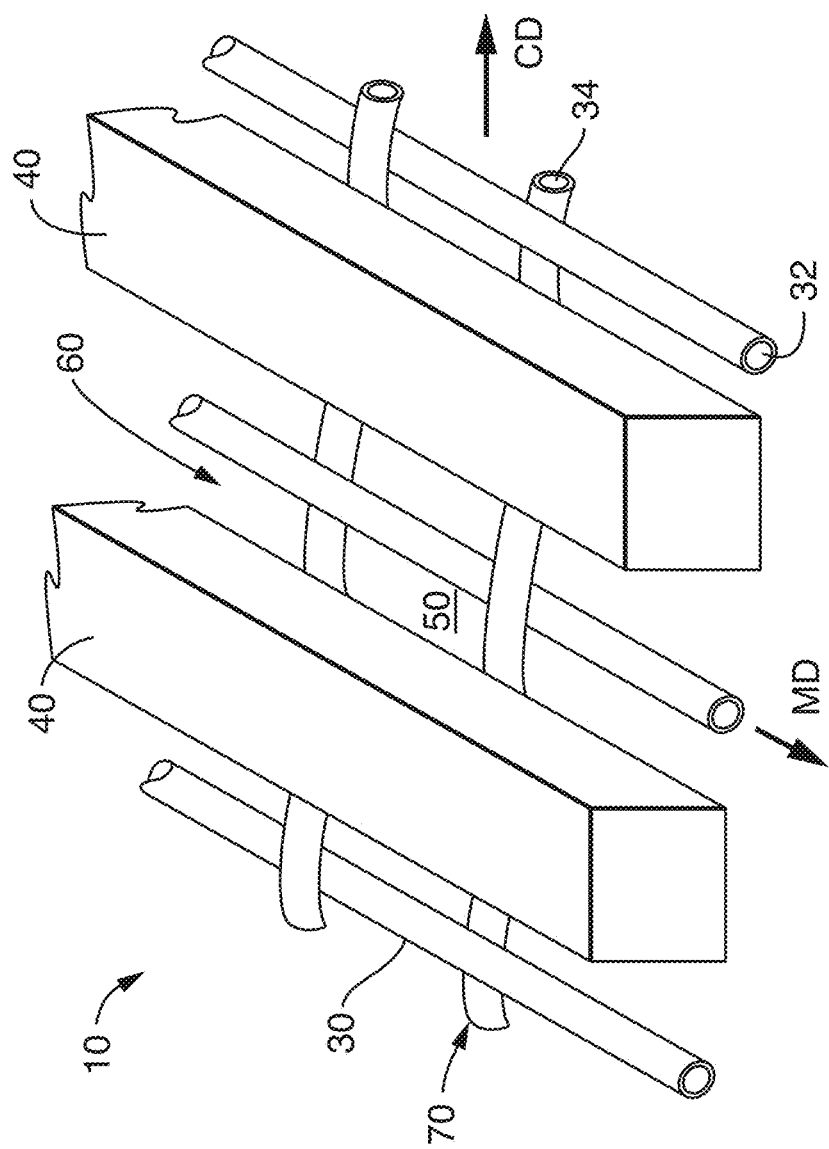
FIG. 1 is a view of a fabric useful in the manufacture of tissue webs according to one embodiment of the present disclosure.

As used herein, the term "tissue product" refers to products made from tissue webs and includes, bath tissues, facial tissues, paper towels, industrial wipers, foodservice wipers, napkins, medical pads, and other similar products. Tissue products may comprise one, two, three or more plies.

As used herein, the terms "tissue web" and "tissue sheet" refer to a fibrous sheet material suitable for forming a tissue product.

As used herein, the term "geometric mean tensile" (GMT) refers to the square root of the product of the machine direction tensile and the cross-machine direction tensile of the web, which are determined as described in the Test Method section.

As used herein, the term "caliper" is the representative thickness of a single sheet (caliper of tissue products comprising two or more plies is the thickness of a single sheet of tissue product comprising all plies) measured in accordance with TAPPI test method T402 using an EMVECO 200-A Microgage automated micrometer (EMVECO, Inc., Newberg, OR). The micrometer has an anvil diameter of 2.22 inches (56.4 mm) and an anvil pressure of 132 grams per square inch (per 6.45 square centimeters) (2.0 kPa).

As used herein, the term "basis weight" generally refers to the bone dry weight per unit area of a tissue and is generally expressed as grams per square meter (gsm). Basis weight is measured using TAPPI test method T-220.

As used herein, the term "sheet bulk" refers to the quotient of the caliper (μm) divided by the bone dry basis weight (gsm). The resulting sheet bulk is expressed in cubic centimeters per gram (cc/g).

As used herein, the term "roll bulk" refers to the volume of paper divided by its mass on the wound roll. Roll bulk is calculated by multiplying pi (3.142) by the quantity obtained by calculating the difference of the roll diameter squared (cm$^2$) and the outer core diameter squared (cm$^2$) divided by 4, divided by the quantity sheet length (cm) multiplied by the sheet count multiplied by the bone dry basis weight of the sheet (gsm).

As used herein, the term "slope" refers to slope of the line resulting from plotting tensile versus stretch and is an output of the MTS TestWorks™ in the course of determining the tensile strength as described in the Test Methods section herein. Slope is reported in the units of grams (g) per unit of sample width (inches) and is measured as the gradient of the least-squares line fitted to the load-corrected strain points falling between a specimen-generated force of 70 to 157 grams (0.687 to 1.540 N) divided by the specimen width. Slopes are generally reported herein as having units of grams per 3 inch sample width or g/3".

As used herein, the term "geometric mean slope" (GM Slope) generally refers to the square root of the product of machine direction slope and cross-machine direction slope.

As used herein, the term "stretch" generally refers to the ratio of the slack-corrected elongation of a specimen at the point it generates its peak load divided by the slack-corrected gauge length in any given orientation. Stretch is an output of the MTS TestWorks™ in the course of determining the tensile strength as described in the Test Methods section herein. Stretch is reported as a percentage and may be reported for machine direction stretch (MDS), cross-machine direction stretch (CDS) or as geometric mean stretch (GMS), which is the square root of the product of machine direction stretch and cross-machine direction stretch.

As used herein, the term "Roll Firmness," generally refers to the ability of a rolled tissue product to withstand deflection when impacted, which is determined as described in the Test Methods section.

As used herein, the term "Roll Structure" generally refers to the overall appearance and quality of a rolled tissue product and is the product of Roll Bulk (expressed in cc/g) and caliper (express in cm) divided by Firmness (expressed in cm). Roll Structure is generally referred to herein without reference to units.

As used herein, the term "Stiffness Index" refers to the quotient of the geometric mean slope (having units of g/3") divided by the geometric mean tensile strength (having units of g/3").

As used herein, the term "Surface Smoothness" refers to the filtered surface image topography measured as described in the Test Method section. Surface Smoothness is expressed as three different values—Sa, Sq and S90—and may have units of millimeters (mm) or microns (μm).

DETAILED DESCRIPTION

Bulk is an important property for the absorption capacity and hand-feel of tissue webs and products. Increasing the bulk of tissue webs and products, however, often comes at the expense of other properties such as surface smoothness. Traditionally the tissue maker has needed to resort to high topography papermaking fabrics to achieve high bulk. While increasing the caliper of the tissue web at a given basis weight, and therefore the sheet bulk, the use of high topography fabrics often impart the web with a three dimensional surface that is not particularly smooth.

The present inventors have now surprisingly discovered that certain papermaking fabrics and in particular through-air drying fabrics having patterns topically disposed thereon may be used to produce tissue webs and products that are both smooth and have high bulk. Accordingly, in certain embodiments the present disclosure provides a tissue web having a sheet bulk greater than about 12 cubic centimeters per gram (cc/g), such as from about 12 to about 20 cc/g, and a Surface Smoothness S90 value less than about 105 μm. In other embodiments the disclosure provides rolled tissue products formed by spirally winding tissue webs where the rolled tissue products have improved roll bulk, such as greater than about 14 cc/g, and improved Roll Firmness, such as from about 8 to about 10 mm.

In accordance with certain embodiments, high bulk tissue webs are manufactured using an endless papermaking belt, such as a through-air drying (TAD) fabric, having a three dimensional pattern disposed thereon. Preferably the three dimensional pattern is disposed on the web contacting surface for cooperating with, and structuring of, the wet fibrous web during manufacturing. In a particularly preferred embodiment the web-contacting three-dimensional structure comprises a plurality of elevations distributed across the web-contacting surface of the belt and together constituting from about 15 to about 35 percent, in a particularly preferred embodiment from about 18 to about 30 percent, and in a particularly preferred embodiment about 20 to about 25 percent of the web-contacting surface.

In addition to elevations, the web-contacting surface preferably comprises a plurality of continuous landing areas between the elevations. The landing areas are bounded by the elevations and coextensive with the top surface plane of the belt.

Each elevation has a first dimension in a first direction (x) in the plane of the top surface area, a second dimension in a second direction (y) in the plane of the top surface area, the first and second directions (x, y) being at right angles to each other, a mean height (h) and an area (a) as measured in the plane of the top surface area, these dimensions being defined when the belt is in an uncompressed state.

One belt for manufacturing a high bulk tissue according to the present disclosure is illustrated in FIG. 1, in one embodiment the endless belt 10 has two principal elements: a carrier structure 30 and three dimensional design elements 40 (also referred to herein as "elevations"). The carrier structure 30 has two opposed surfaces—a tissue contacting surface 50 and a machine contacting surface. Generally the design elements 40 are disposed on the tissue contacting surface 50. When the belt 10 comprises a through-air drying fabric the tissue contacting surface 50 supports the embryonic tissue web, while the opposite surface, the machine contacting surface, contacts the throughdryer.

The carrier structure 30 has two principle dimensions—a machine direction ("MD"), which is the direction within the plane of the belt 10 parallel to the principal direction of travel of the tissue web during manufacture and a cross-machine direction ("CD"), which is generally orthogonal to the machine direction.

The carrier structure is preferably a woven fabric, and in a particularly preferred embodiment a substantially planar woven fabric such as a multi-layered plain-woven fabric 30 having base warp yarns 32 interwoven with shute yarns 34 in a 1×1 plain weave pattern. An exemplary multi-layered fabric is disclosed in U.S. Pat. No. 8,141,595, the contents of which are incorporated herein in a manner consistent with the present disclosure. In the fabric 30, the plain-weave load-bearing layer is constructed so that the highest points of both the load-bearing shutes 34 and the load-bearing warps 32 are coplanar and coincident with the plane 70.

Figure 2:
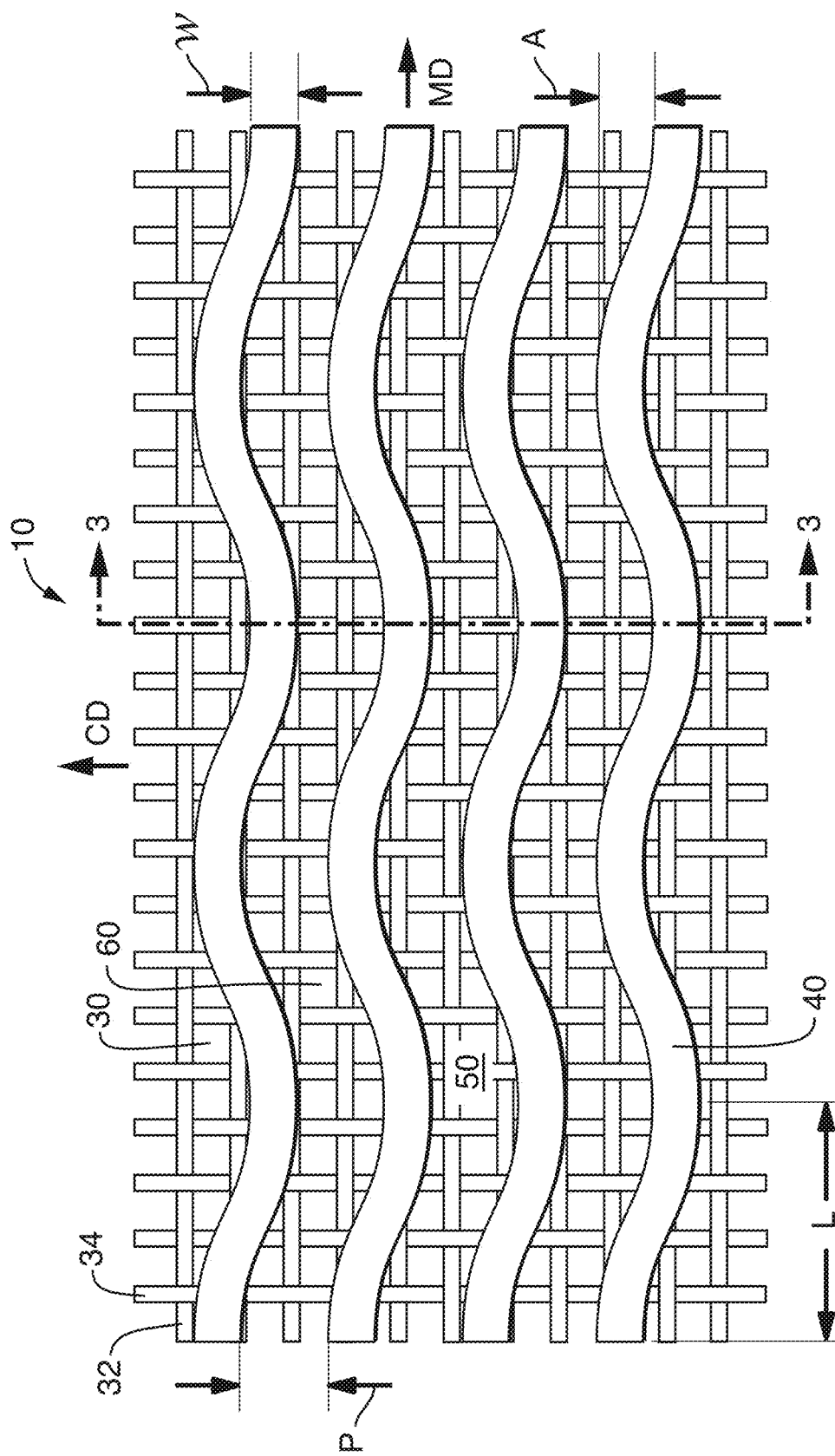
FIG. 2 is top perspective view of a fabric useful in the manufacture of tissue webs according to one embodiment of the present disclosure.
Figure 3:
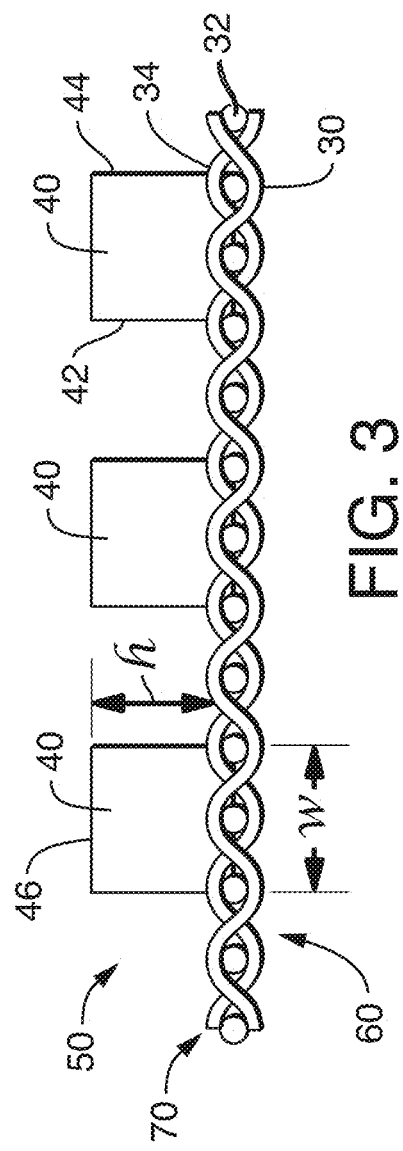
FIG. 3 is a cross section view of a fabric useful in the manufacture of tissue webs according to one embodiment of the present disclosure taken through line 3-3 of FIG. 2.

As illustrated in FIGS. 2 and 3, the design elements 40 are joined to the carrier structure 30 and extend outwardly from the paper contacting side 50 thereof in the Z-direction. Generally the design elements 40 are topically applied to the carrier structure 30. Particularly suitable methods of topical application are printing or extruding polymeric material onto the surface. Alternative methods include applying cast or cured films, weaving, embroidering or stitching polymeric fibers into the surface to a design element. Particularly suitable polymeric materials include materials that can be strongly adhered to carrier structure and are resistant to thermal degradation at typical tissue machine dryer operating conditions and are reasonably flexible, such as silicones, polyesters, polyurethanes, epoxies, polyphenylsulfides and polyetherketones.

The design element 40 extends in the Z-direction (generally orthogonal both the machine direction and cross-machine direction) above the plane 70 of the carrier structure 30. The design elements 40 may have straight sidewalls or tapered sidewalls, and be made of any material suitable to withstand the temperatures, pressures, and deformations which occur during the papermaking process. As illustrated in FIG. 3, the design elements 40 are similarly sized and have generally straight, parallel sidewalls 42, providing the elements 40 with a width (w), and a height (h). For the embodiments described herein, the design elements 40 preferably have a height between 0.6 and 3.0 mm, preferably between 0.7 and 1.4 mm, and in a particularly preferred embodiment between 0.8 and 1.0 mm. The height (h) is generally measured as the distance between the plane of the carrier structure and the top plane of the elevations.

In addition to having a height (h), the elevations 40 have a width (w). The width is measured generally normal to the principal dimension of the elevation 40 within the plane of the belt 10 at a given location. Where the element 40 has a generally square or rectangular cross section, the width (w) is generally measured as the distance between the two planar sidewalls 42, 44 that form the element 40. In those cases where the element does not have planar sidewalls, the width is measured at the point where the element 40 contacts the carrier 30.

Generally, for the embodiments described herein, the design elements 40 have a width from about 0.6 to 3.1 mm, in a particularly preferred embodiment from about 0.7 to about 1.5 mm, and still more preferably from about 0.8 to about 1.1 mm.

In a particularly preferred embodiment the design elements 40 preferably have planar sidewalls 42, 44 such that the cross section of the design element has an overall square or rectangular shape. However, it is to be understood that the design element may have other cross sectional shapes, such as triangular, convex or concave, which may also be useful in producing high bulk tissue products according to the present disclosure. Accordingly, in a particularly preferred embodiment the design elements 40 preferably have planar sidewalls 42, 44 and a square cross section where the width (w) and height (h) are equal and vary from about 0.6 to about 3.0 mm, in a particularly preferred embodiment from about 0.7 to about 1.4 mm and still more preferably from about 0.8 to about 1.0 mm.

With further reference to FIG. 2, a preferred embodiment illustrating the spacing and arrangement of elevations 40 is illustrated. Generally, none of the elevations 40 intersect one another and preferably are arranged parallel to one another. As such, in the illustrated embodiment, the adjacent sidewalls of individual design elements are equally spaced apart from one another.

For the embodiments described herein, the center-to-center spacing of design elements (also referred to herein as pitch or simply as p) is from about 1.7 to about 20 mm apart, such as from about 2.0 to about 10 mm apart, and in a particularly preferred embodiment from about 3.8 to about 4.4 mm apart, in a direction generally orthogonal to such surfaces. This spacing will result in a tissue web which generates maximum caliper when made of conventional cellulosic fibers. Further, this arrangement provides a tissue web having three dimensional surface topography, yet relatively uniform density.

As further illustrated in FIG. 2, the design elements 40 may occur as wave-like patterns that are arranged in-phase with one another such that p is approximately constant. In other embodiments design elements may form a wave pattern where adjacent design elements are offset from one another. Regardless of the particular design element pattern, or whether adjacent patterns are in or out of phase with one another, the design elements are separated from one another by some minimal distance. Preferably the distance between design elements 40 is greater than 0.7 mm and in a particularly preferred embodiment greater than about 1.0 mm and still more preferably greater than about 2.0 mm such as from about 2.0 to about 6.0 mm and still more preferably from about 3.0 to about 4.5 mm.

Where the design elements 40 are wave-like, such as those illustrated in FIG. 1, the design elements have an amplitude (A) and a wavelength (L). The amplitude may range from about 2.0 to about 200 mm, in a particularly preferred embodiment from about 10 to about 40 mm and still more preferably from about 18 to about 22 mm.

For example, the present disclosure provides single-ply tissue products having improved caliper and bulk compared to commercially available single-ply tissue products, while also having decreased stiffness. These improvements translate into improved rolled products, as summarized in Table 1, below.

TABLE 1

| Product | Basis Wt. (gsm) | Caliper (m) | Sheet Bulk (cc/g) | GMT (g/3") | GM Stretch (%) | GM Slope (g/3") | Stiffness Index | Roll Bulk (cc/g) | Roll Firmness (mm) |
|---|---|---|---|---|---|---|---|---|---|
| Cottonelle Clean Care | 41.1 | 498 | 12.1 | 861 | 11.9 | 7974 | 9.26 | 10.9 | 7.8 |
| Charmin Basic | 29.9 | 348 | 11.6 | 913 | 12.5 | 8628 | 9.45 | 11 | 7.9 |
| Scott Extra Soft | 30.2 | 361 | 12.0 | 727 | 11.7 | 6998 | 9.63 | 9 | 3.9 |
| Inventive Sample | 41.6 | 752 | 18.1 | 805 | 11.1 | 5988 | 7.4 | 15.4 | 9.3 |
| Inventive Sample | 41.0 | 752 | 18.3 | 978 | 19.4 | 3826 | 3.91 | 15.3 | 9.2 |
| Inventive Sample | 43.9 | 782 | 17.8 | 927 | 12.1 | 5814 | 6.27 | 14.6 | 9.3 |

Similarly, the wavelength may range from about 20 to about 500 mm, in a particularly preferred embodiment from about 50 to about 200 mm and still more preferably from about 80 to about 120 mm.

Figure 4:
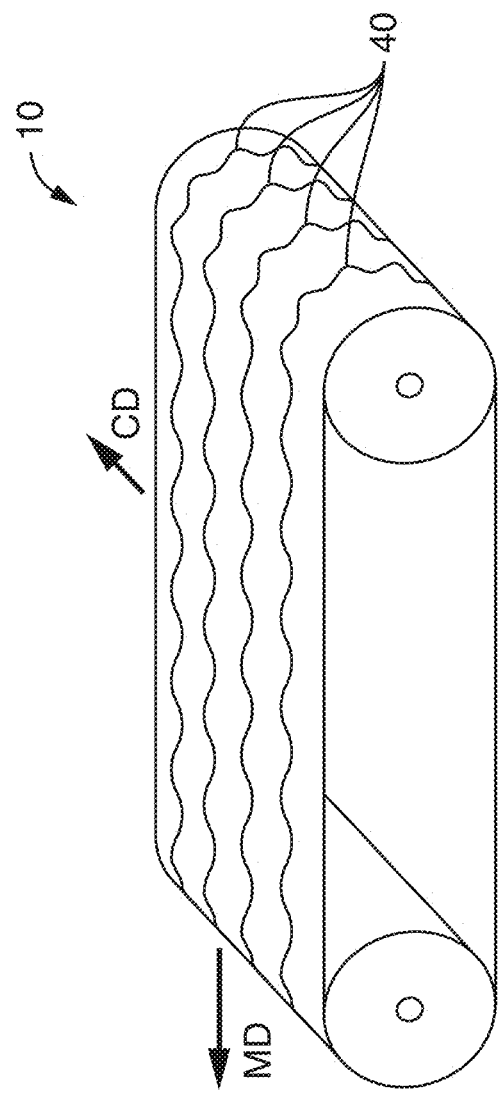
FIG. 4 illustrates a continuous fabric useful in the manufacture of tissue webs according to one embodiment of the present disclosure.
Figure 5:
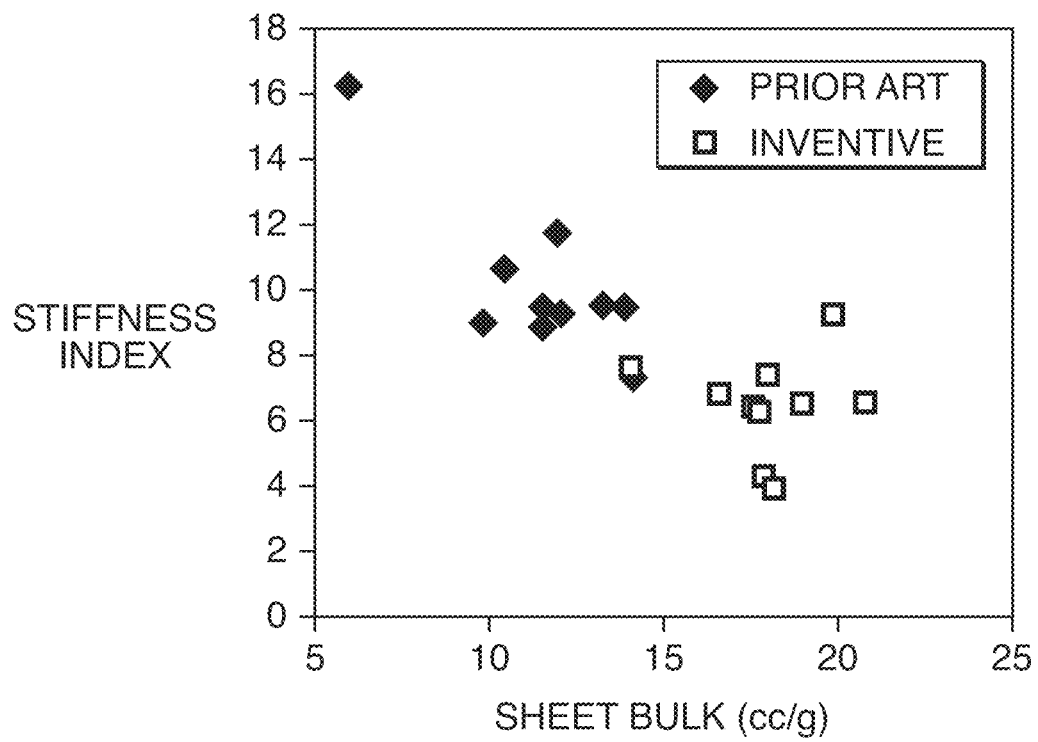
FIG. 5 is a graph comparing sheet bulk (x-axis) and Stiffness Index (y-axis) for inventive and prior art tissue products.
Figure 6:
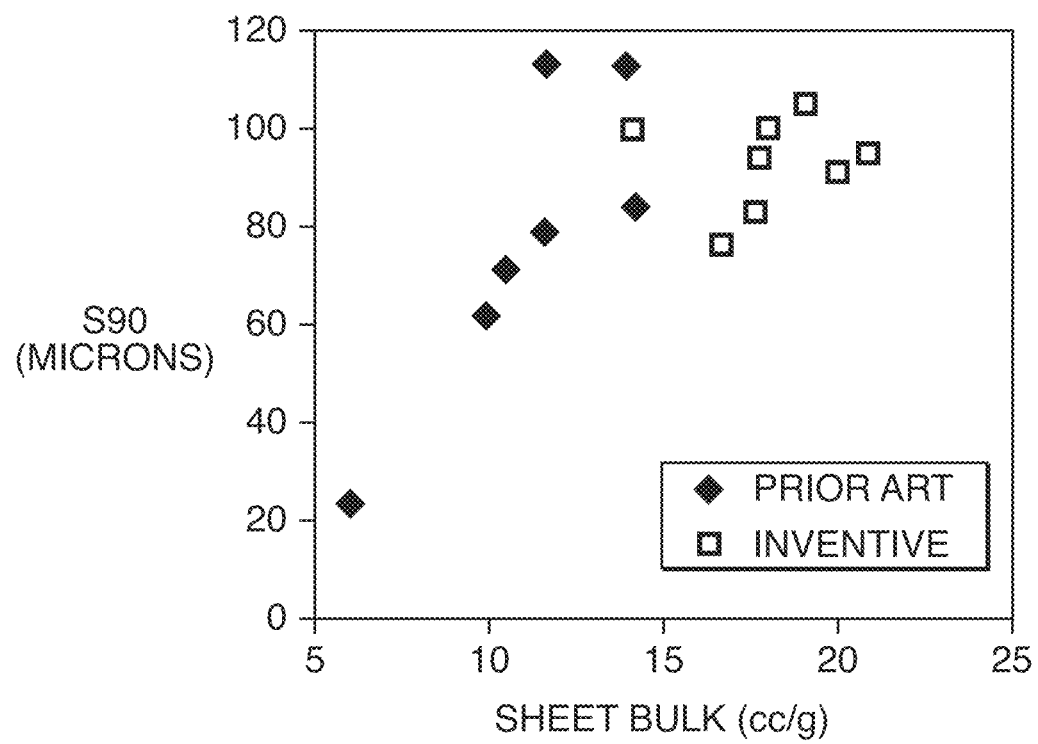
FIG. 6 is a graph comparing sheet bulk (x-axis) and Surface Smoothness S90 (y-axis) for inventive and prior art tissue products.
Figure 7:
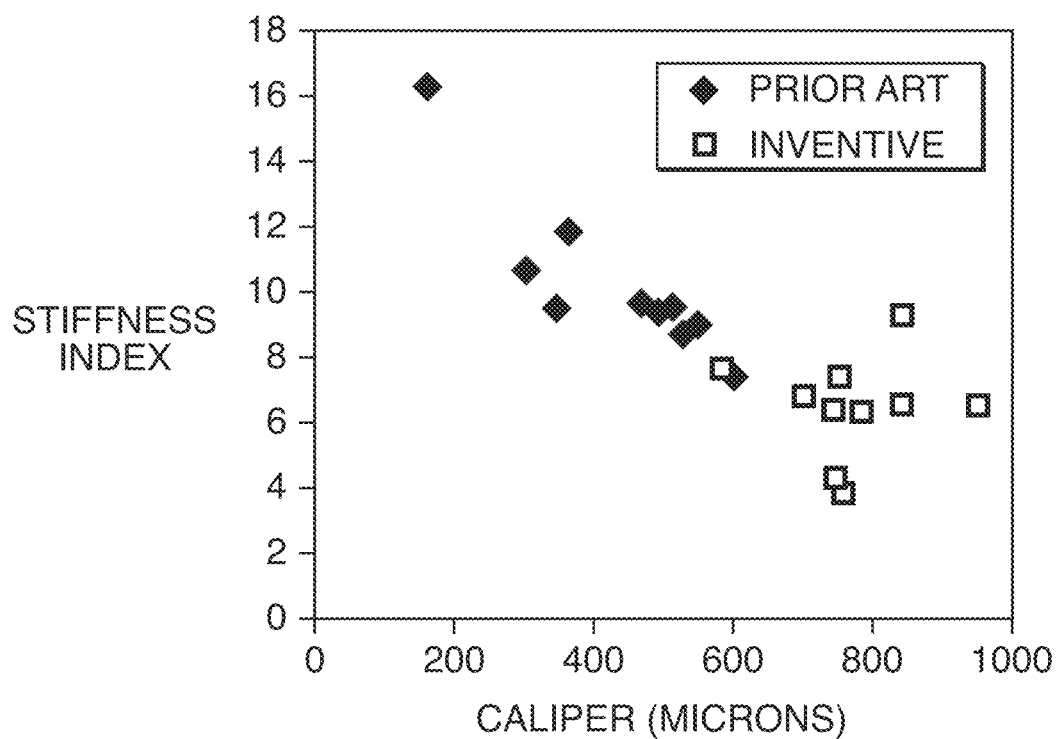
FIG. 7 is a graph comparing caliper (x-axis) and Stiffness Index (y-axis) for inventive and prior art tissue products.

Preferably a plurality of design elements are disposed on the carrier structure and extend substantially throughout one dimension thereof, and each element in the plurality is spaced apart from adjacent elements. In this manner the elements may span the entire cross-machine direction of the belt and may endlessly encircle the belt in the machine direction. For example, as illustrated in FIG. 4, the elements 40 are oriented substantially parallel to the machine direction of the belt 10.

The polymeric material, or other material used to form the design elements 40, may be applied and joined to the carrier structure in any suitable manner. One manner of attachment and joining the design element onto the carrier structure is described in U.S. application Ser. No. 10/535,537, the contents of which are incorporated herein by reference in a manner consistent with the present disclosure. Thus, in a particularly preferred embodiment, the design element is formed by extruding or printing a polymeric material onto the carrier structure. In other embodiments the design element may be produced, at least in some regions, by extruding two or more polymeric materials. Suitable polymer materials include silicones, polyesters, polyurethanes, epoxies, polyphenylsulfides and polyetherketones.

In addition to the design elements 40 the belt 10 further comprises landing areas 60, which are bounded by the design elements 40. The landing areas 60 allow water to be removed from the web by the application of differential fluid pressure, by evaporative mechanisms, or both when drying air passes through the web while on the belt 10 or a vacuum is applied through the belt 10.

The arrangement of design elements 40 and landing areas 60 yield a papermaking fabric having a three dimensional surface topography, which when used to form a tissue web, produces a web having relatively uniform density, yet three dimensional surface topography. The resulting web further has improved bulk, better softness, and improved surface smoothness compared to webs and products made according to the prior art. Similarly, rolled products prepared according to the present disclosure may have improved roll firmness and bulk, while still maintaining Surface Smoothness and strength properties.

Accordingly, in certain embodiments, rolled tissue products may comprise a spirally wound single-ply or multi-ply (such as two, three or four plies) tissue web having a basis weight greater than about 35 gsm, such as from about 35 to about 60 gsm and in a particularly preferred embodiment from about 38 to about 50 gsm.

Rolled tissue products comprising a spirally wound single-ply tissue web generally have a Roll Firmness less than about 10 mm, such as from about 7 to about 10 mm and in a particularly preferred embodiment from about 8 to about 9 mm. In one particular embodiment, for instance, the disclosure provides a rolled tissue product comprising a spirally wound single-ply tissue web having a basis weight from about 35 to about 50 gsm, wherein the roll has a Roll Firmness from about 8 to about 10 mm. Within the above-roll firmness ranges, rolls made according to the present disclosure do not appear to be overly soft and "mushy" as may be undesirable by some consumers during some applications.

In the past, at the above-roll firmness levels, spirally wound tissue products had a tendency to have low roll bulks and/or poor sheet softness properties. However, it has now been discovered that rolled tissue products having a firmness from about 7 to about 10 mm and comprising single-ply webs having basis weights greater than about 35 gsm can be produced such that the product has a roll bulk of greater than 10 cc/g, such as from about 10 to about 20 cc/g, and in a particularly preferred embodiment from about 14 to about 18 cc/g, even when spirally wound under tension. For instance, spirally wound products comprising a single-ply web having a basis weight from about 35 to about 50 gsm may have a roll bulk of greater than 12 cc/g while still maintaining a firmness of less than about 10 mm, such as from about 8 to about 10 mm.

To produce rolled products having satisfactory roll bulk and firmness, the tissue web itself preferably has improved sheet bulk. For example, single-ply base sheets prepared as described herein may be converted to rolled tissue product while still maintaining much of their sheet bulk, which is preferably greater than about 12 cc/g, such as from about 12 to about 20 cc/g and in a particularly preferred embodiment from about 14 to about 18 cc/g. In this manner base sheets may be subjected to calendering or the like to soften the web while still maintaining a sufficient amount of sheet bulk.

While having improved properties, the tissue webs prepared according to the present disclosure continue to be strong enough to withstand use by a consumer. For example, tissue webs prepared according to the present disclosure may have a geometric mean tensile (GMT) greater than about 700 g/3", such as from about 800 to about 1500 g/3", and in a particularly preferred embodiment from about 900 to about 1200 g/3". When the tissue webs of the present disclosure are converted into rolled tissue products, they maintain a significant amount of their tensile strength, such that the decrease in geometric mean tensile during conversion of the web to finished product is less than about 30 percent and in a particularly preferred embodiment less than about 25 percent, such as from about 10 to about 30 percent.

As such the finished products preferably have a geometric mean tensile strength of greater than 700 g/3", such as from about 800 to about 1200 g/3", and in a particularly preferred embodiment from about 900 to about 1100 g/3".

In still other embodiments, the present disclosure provides tissue webs having enhanced bulk, softness and durability. Improved durability, such as increased machine and cross-machine direction stretch (MDS and CDS), and improved softness may be measured as a reduction in the slope of the tensile-strain curve or the Stiffness Index. For example, tissue webs prepared as described herein generally have a geometric mean slope less than about 6,000 g/3", such as from about 4,000 to about 6,000 g/3", and in a particularly preferred embodiment from about 4,200 to about 5,000 g/3". Single-ply webs spirally wound into rolled products generally have a geometric mean slope less than about 10,000 g/3", such as from about 3,000 to about 9,000 g/3" and in a particularly preferred embodiment from about 4,000 to about 8,000 g/3". Two-ply webs spirally wound into rolled products generally have a geometric mean slope less than about 9,000 g/3", such as from about 4,000 to about 8,000 g/3".

While the tissue webs of the present disclosure generally have lower geometric mean slopes compared to webs of the prior art, the webs maintain a sufficient amount of tensile strength to remain useful to the consumer. In this manner the disclosure provides base sheet and tissue products having a low Stiffness Index. For example, tissue webs preferably have a Stiffness Index less than about 8.0, such as from about 5.0 to about 7.0 and in a particularly preferred embodiment from about 4.0 to about 6.5.

When converted into rolled products the tissue web is often stiffened slightly. However, the amount of stiffness introduced to the inventive webs during conversion is minimal such that single-ply tissue products have a Stiffness Index less than about 8.0, such as from about 4.0 to about 7.0 and in a particularly preferred embodiment from about 5.0 to about 6.5. In a particularly preferred embodiment the present disclosure provides a single-ply tissue web having a bone dry basis weight greater than about 35 gsm, a Stiffness Index from about 4 to about 8 and a GMT from about 700 to about 1000 g/3".

Similarly, tissue webs that are converted to finished product, for example by calendering or the like, generally have decreased machine and cross-direction stretch (MDS and CDS respectively) relative to the base sheet. However, the reduction in CDS and MDS is relatively minimal for products prepared according to the present disclosure. For example, in certain embodiments base sheets may have a geometric mean stretch (GMS) greater than about 12, such as from about 12 to about 30 and in a particularly preferred embodiment from about 16 to about 25 percent. The corresponding finished singly-ply product preferably has a GMS greater than about 10, such as from about 10 to about 20 and in a particularly preferred embodiment from about 14 to about 18 percent.

As noted previously, webs prepared as described herein may be converted into either single or multi-ply rolled tissue products that have improved properties over the prior art. In one embodiment the present disclosure provides a rolled tissue product comprising a spirally wound two-ply tissue web, wherein the tissue web has a bone dry basis weight greater than about 35 gsm, a sheet bulk greater than about 15 cc/g and a Stiffness Index less than about 7. In a particularly preferred embodiment the rolled product has a roll bulk of greater than about 15 cc/g and a Roll Firmness less than about 10 mm, such as from about 8 to about 10 mm. For comparative purposes the improved properties of multi-ply tissue products are set forth in Table 2, below.

TABLE 2

| Product | Basis Wt. (gsm) | Caliper (μm) | Sheet Bulk (cc/g) | GMT (g/3") | GM Stretch (%) | GM Slope (kg/3") | Stiffness Index | Roll Bulk (cc/g) | Roll Firmness (mm) |
|---|---|---|---|---|---|---|---|---|---|
| Cottonelle Ultra Comfort Care | 42 | 597 | 14.2 | 916 | 13.1 | 6702 | 7.32 | 13.9 | 8.7 |
| Charmin Ultra Soft | 45.6 | 528 | 11.6 | 751 | 15.0 | 6609 | 8.80 | 10.9 | 4.9 |
| Quilted Northern Ultra Plush | 55.4 | 546 | 9.86 | 730 | 13.5 | 6567 | 9.00 | 9.4 | 7.6 |
| Great Value Ultra-Strong | 35.4 | 475 | 13.4 | 1206 | 8.1 | 11447 | 9.49 | 13.6 | 9.4 |
| Inventive Sample | 42.1 | 704 | 16.7 | 922 | 11.9 | 6229 | 6.76 | 16.4 | 8.8 |

In addition to having improved bulk, stiffness, firmness and the like, tissue webs and products produced according to the methods set forth herein also have improved tactile properties such as improved Surface Smoothness. It is known in the art that the Pacinian system of receptors in the human fingertip is most sensitive at a frequency of about 250 Hz where vibrations at, or near, 250 Hz are experienced as being rough. Thus, the perception of whether the surface of a tissue product is rough or smooth is dependent on the rate at which a user passes their finger over the surface and the wavelength of any surface topography on the tissue. For example, if a user passes their fingers over the surface of a tissue product at a rate of 4 cm/sec, a surface topography with a wavelength of about 0.16 mm will be experienced as rough by the Pacinian system.

Because of the relationship between surface topography and perceived smoothness or roughness, the relative feel of a tissue may be predicted based upon its surface topography. Surface topography may be measured using profilometry, for example by the Smoothness Test Method set forth below. Profilometry is used to generate a digital image of the tissue product surface. The digital image is then filtered using a band pass filter with cut off spatial frequencies of 0.095 mm and 0.5 mm to emphasize spatial frequencies experienced as being most rough by the human fingertip. The filtered surface image is then analyzed to yield Surface Smoothness values Sa, Sq and S90, where surfaces having lower values are generally perceived as being smoother.

Accordingly, in certain embodiments, tissue products of the current disclosure have improved smoothness, such as low Sa, Sq and/or S90 values, while also having improved sheet caliper and bulk. For example, in one embodiment the disclosure provides a tissue product having a Surface Smoothness Sa value less than about 25 µm, an Sq value of less than about 35 µm, an S90 value less than about 105 µm and a sheet bulk of greater than 15 cc/g. In other embodiments the disclosure provides a tissue product having a Surface Smoothness Sa value from about 15 to about 25 µm. In other embodiment the disclosure provides a tissue product having a Surface Smoothness Sq value from about 25 to about 40 µm. In still other embodiments the disclosure provides a tissue product having a Surface Smoothness S90 value from about 70 to about 120 µm. A comparison of Surface Smoothness properties, as well as other product properties, is set forth in the Table 3, below.

TABLE 3

| Product | Plies | Sheet Bulk (cc/g) | Caliper (µm) | Sa (µm) | Sq (µm) | S90 (µm) |
|---|---|---|---|---|---|---|
| Cottonelle Ultra Comfort Care | 2 | 14.2 | 597 | 18.5 | 31.2 | 84.0 |
| Charmin Ultra Soft | 2 | 11.6 | 528 | 23.7 | 39.5 | 113 |
| Quilted Northern Ultra Plush | 3 | 9.86 | 546 | 14.7 | 20.3 | 61.6 |
| Charmin Basic | 1 | 11.6 | 348 | 17.0 | 27.4 | 78.7 |
| Cottonelle Clean Care | 1 | 12.1 | 498 | 16.0 | 23.6 | 71.3 |
| Inventive Sample | 1 | 17.8 | 782 | 21.1 | 33.7 | 95.1 |
| Inventive Sample | 2 | 16.7 | 922 | 19.5 | 30.7 | 90.8 |

In a particularly preferred embodiment the present disclosure provides a multi-ply tissue product having a caliper greater than about 600 µm, such as from about 600 µm to about 1000 µm and a Surface Smoothness S90 value less than about 95 µm, such as from about 70 to about 95 µm. In still other embodiments the present disclosure provides a single-ply tissue product having a sheet bulk greater than about 15 cc/g, such as from about 15 to about 20 cc/g and a smooth surface, such that Sa is less than about 22 µm, Sq is less than about 35 µm and S90 is less than about 100 µm.

In other embodiments the disclosure provides a single-ply tissue product having a sheet bulk greater than about 15 cc/g, such as from about 15 to about 20 cc/g, and a Surface Smoothness S90 value less than about 105 µm, such as from about 70 to about 105 µm.

In addition to providing the foregoing benefits, it is also believed that by forming a tissue web using a belt having a carrier structure and a suitably chosen design element that nesting may be reduced when the webs are converted into rolled product forms. Reduced nesting in-turn improves certain properties, such as bulk and firmness, of the rolled product. Typically, nesting arises as a result of using textured through-air drying fabrics, which impart the tissue web with valleys and ridges. While these ridges and valleys can provide many benefits to the resulting web, problems sometimes arise when the web is converted into final product forms. For example, when webs are converted to rolled products, the ridges and valleys of one winding are placed on top of corresponding ridges and valleys of the next winding, which causes the roll to become more tightly packed, thereby reducing roll bulk (increasing density) and making the winding of the product less consistent and controllable. Thus, in certain embodiments the present disclosure provides tissue products comprising a tissue web having a three dimensional design element, wherein the design elements reduce nesting of the web when it is converted into a rolled product.

Rolls formed according to the present disclosure generally have higher roll bulk at a given roll firmness. Further, the rolls generally have a surprising degree of interlocking between successive wraps of the spirally wound web, improving roll structure at a given roll firmness, more specifically allowing less firm rolls to be made without slippage between wraps. For example, compared to tissue products produced using a through-air drying fabric with an offset seam, rolled tissue products of the present disclosure have reduced nesting and improved roll structure. One measurement reduced nesting and improved roll structure, referred to herein as Roll Structure, is the product of Roll Bulk (expressed in cc/g) and caliper (express in cm) divided by Firmness (expressed in cm). Generally rolled tissue products of the present invention have a Roll Structure greater than about 1.0 and in a particularly preferred embodiment greater than about 1.25 and in a particularly preferred embodiment less than about 1.5, such as from about 1.0 to about 2.0 and in particularly preferred embodiments from about 1.2 to about 1.8. A comparison of the Roll Structure of inventive samples and commercially available rolled products is provided in Table 4, below.

TABLE 4

| Product | Plies | Caliper (cm) | Roll Bulk (cc/g) | Firmness (cm) | Roll Structure |
|---|---|---|---|---|---|
| Cottonelle Ultra Comfort Care | 2 | 0.0597 | 13.9 | 0.87 | 0.95 |
| Charmin Ultra Soft | 2 | 0.0528 | 10.9 | 0.49 | 1.17 |
| Quilted Northern Ultra Plush | 3 | 0.0546 | 9.4 | 0.76 | 0.68 |
| Cottonelle Clean Care | 1 | 0.0498 | 10.9 | 0.78 | 0.70 |
| Charmin Basic | 1 | 0.0348 | 11 | 0.79 | 0.48 |
| Scott Extra Soft | 1 | 0.0361 | 9 | 0.39 | 0.83 |
| Inventive | 1 | 0.0752 | 15.4 | 0.64 | 1.81 |
| Inventive | 2 | 0.704 | 16.4 | 0.88 | 1.31 |

Webs useful in preparing spirally wound tissue products according to the present disclosure can vary depending upon the particular application. In general, the webs can be made from any suitable type of fiber. For instance, the base web can be made from pulp fibers, other natural fibers, synthetic fibers, and the like. Suitable cellulosic fibers for use in connection with this invention include secondary (recycled) papermaking fibers and virgin papermaking fibers in all proportions. Such fibers include, without limitation, hardwood and softwood fibers as well as nonwoody fibers. Noncellulosic synthetic fibers can also be included as a portion of the furnish.

Tissue webs made in accordance with the present disclosure can be made with a homogeneous fiber furnish or can be formed from a stratified fiber furnish producing layers within the single- or multi-ply product. Stratified base webs can be formed using equipment known in the art, such as a multi-layered headbox. Both strength and softness of the base web can be adjusted as desired through layered tissues, such as those produced from stratified headboxes.

For instance, different fiber furnishes can be used in each layer in order to create a layer with the desired characteristics. For example, layers containing softwood fibers have higher tensile strengths than layers containing hardwood fibers. Hardwood fibers, on the other hand, can increase the softness of the web. In one embodiment, the single-ply base web of the present disclosure includes a first outer layer and a second outer layer containing primarily hardwood fibers. The hardwood fibers can be mixed, if desired, with paper broke in an amount up to about 10 percent by weight and/or softwood fibers in an amount up to about 10 percent by weight. The base web further includes a middle layer positioned in between the first outer layer and the second outer layer. The middle layer can contain primarily softwood fibers. If desired, other fibers, such as high-yield fibers or synthetic fibers may be mixed with the softwood fibers in an amount up to about 10 percent by weight.

When constructing a web from a stratified fiber furnish, the relative weight of each layer can vary depending upon the particular application. For example, in one embodiment, when constructing a web containing three layers, each layer can be from about 15 to about 40 percent of the total weight of the web, such as from about 25 to about 35 percent of the weight of the web.

Wet strength resins may be added to the furnish as desired to increase the wet strength of the final product. Useful wet strength resins include diethylenetriamine (DETA), triethylenetetramine (TETA), tetraethylenepentamine (TEPA), epichlorhydrin resin(s), polyamide-epichlorohydrin (PAE), or any combinations thereof, or any resins to be considered in these families of resins. Particularly preferred wet strength resins are polyamide-epichlorohydrin (PAE) resins. Commonly PAE resins are formed by first reacting a polyalkylene polyamine and an aliphatic dicarboxylic acid or dicarboxylic acid derivative. A polyaminoamide made from diethylenetriamine and adipic acid or esters of dicarboxylic acid derivatives is most common. The resulting polyaminoamide is then reacted with epichlorohydrin, Useful RAE resins are sold under the trade name Kymene® (commercially available from Ashland, Inc., Covington, Ky.).

Similarly, dry strength resins can be added to the furnish as desired to increase the dry strength of the final product. Such dry strength resins include, but are not limited to carboxymethyl celluloses (CMC), any type of starch, starch derivatives, gums, polyacrylamide resins, and others as are well known. Commercial suppliers of such resins are the same as those that supply the wet strength resins discussed above.

As described above, the tissue products of the present disclosure can generally be formed by any of a variety of papermaking processes known in the art. Preferably the tissue web is formed by through-air drying and can be either creped or uncreped. For example, a papermaking process of the present disclosure can utilize adhesive creping, wet creping, double creping, embossing, wet-pressing, air pressing, through-air drying, creped through-air drying, uncreped through-air drying, as well as other steps in forming the paper web. Some examples of such techniques are disclosed in U.S. Pat. Nos. 5,048,589, 5,399,412, 5,129,988 and 5,494,554 all of which are incorporated herein in a manner consistent with the present disclosure. When forming multiply tissue products, the separate plies can be made from the same process or from different processes as desired.

Preferably the base web is formed by an uncreped through-air drying process, such as the processes described, for example, in U.S. Pat. Nos. 5,656,132 and 6,017,417, both of which are hereby incorporated by reference herein in a manner consistent with the present disclosure.

In one embodiment the web is formed using a twin wire former having a papermaking headbox that injects or deposits a furnish of an aqueous suspension of papermaking fibers onto a plurality of forming fabrics, such as the outer forming fabric and the inner forming fabric, thereby forming a wet tissue web. The forming process of the present disclosure may be any conventional forming process known in the papermaking industry. Such formation processes include, but are not limited to, Fourdriniers, roof formers such as suction breast roll formers, and gap formers such as twin wire formers and crescent formers.

The wet tissue web forms on the inner forming fabric as the inner forming fabric revolves about a forming roll. The inner forming fabric serves to support and carry the newly-formed wet tissue web downstream in the process as the wet tissue web is partially dewatered to a consistency of about 10 percent based on the dry weight of the fibers. Additional dewatering of the wet tissue web may be carried out by known paper making techniques, such as vacuum suction boxes, while the inner forming fabric supports the wet tissue web. The wet tissue web may be additionally dewatered to a consistency of greater than 20 percent, more specifically between about 20 to about 40 percent, and more specifically about 20 to about 30 percent.

The forming fabric can generally be made from any suitable porous material, such as metal wires or polymeric filaments. For instance, some suitable fabrics can include, but are not limited to, Albany 84M and 94M available from Albany International (Albany, N.Y.) Asten 856, 866, 867, 892, 934, 939, 959, or 937; Asten Synweve Design 274, all of which are available from Asten Forming Fabrics, Inc. (Appleton, Wis.); and Voith 2164 available from Voith Fabrics (Appleton, Wis.).

The wet web is then transferred from the forming fabric to a transfer fabric while at a solids consistency of between about 10 to about 35 percent, and particularly, between about 20 to about 30 percent. As used herein, a "transfer fabric" is a fabric that is positioned between the forming section and the drying section of the web manufacturing process.

Transfer to the transfer fabric may be carried out with the assistance of positive and/or negative pressure. For example, in one embodiment, a vacuum shoe can apply negative pressure such that the forming fabric and the transfer fabric simultaneously converge and diverge at the leading edge of the vacuum slot. Typically, the vacuum shoe supplies pressure at levels between about 10 to about 25 inches of mercury. As stated above, the vacuum transfer shoe (negative pressure) can be supplemented or replaced by the use of positive pressure from the opposite side of the web to blow the web onto the next fabric. In some embodiments, other vacuum shoes can also be used to assist in drawing the fibrous web onto the surface of the transfer fabric.

Typically, the transfer fabric travels at a slower speed than the forming fabric to enhance the MD and CD stretch of the web, which generally refers to the stretch of a web in its cross (CD) or machine direction (MD) (expressed as percent elongation at sample failure). For example, the relative speed difference between the two fabrics can be from about 1 to about 45 percent, in some embodiments from about 5 to about 30 percent, and in some embodiments, from about 15 to about 28 percent. This is commonly referred to as "rush transfer". During "rush transfer", many of the bonds of the web are believed to be broken, thereby forcing the sheet to bend and fold into the depressions on the surface of the transfer fabric. Such molding to the contours of the surface of the transfer fabric may increase the MD and CD stretch of the web. Rush transfer from one fabric to another can follow the principles taught in any one of the following patents, U.S. Pat. Nos. 5,667,636, 5,830,321, 4,440,597, 4,551,199, 4,849,054, all of which are hereby incorporated by reference herein in a manner consistent with the present disclosure.

The wet tissue web is then transferred from the transfer fabric to a through-air drying fabric. Typically, the transfer fabric travels at approximately the same speed as the through-air drying fabric. However, a second rush transfer may be performed as the web is transferred from the transfer fabric to the through-air drying fabric. This rush transfer is referred to as occurring at the second position and is achieved by operating the through-air drying fabric at a slower speed than the transfer fabric.

In addition to rush transferring the wet tissue web from the transfer fabric to the through-air drying fabric, the wet tissue web may be macroscopically rearranged to conform to the surface of the through-air drying fabric with the aid of a vacuum transfer roll or a vacuum transfer shoe. If desired, the through-air drying fabric can be run at a speed slower than the speed of the transfer fabric to further enhance MD stretch of the resulting absorbent tissue product. The transfer may be carried out with vacuum assistance to ensure conformation of the wet tissue web to the topography of the through-air drying fabric.

While supported by a through-air drying fabric, the wet tissue web is dried to a final consistency of about 94 percent or greater by a through-air dryer. The web then passes through the winding nip between the reel drum and the reel and is wound into a roll of tissue for subsequent converting.

The following examples are intended to illustrate particular embodiments of the present disclosure without limiting the scope of the appended claims.

Test Methods

Surface Smoothness

Surface Smoothness was measured by first generating a digital image of the fabric contacting surface of a sample using an FRT MicroSpy® Profile profilometer (FRT of America, LLC, San Jose, Calif.) and then analyzing the image using Nanovea® Ultra software version 6.2 (Nanovea Inc., Irvine, Calif.). Samples (either base sheet or finished product) were cut into squares measuring 145×145 mm. The samples were then secured to the x-y stage of the profilometer using tape, with the fabric contacting surface of the sample facing upwards, being sure that the samples were laid flat on the stage and not distorted within the profilometer field of view.

Once the sample was secured to the stage the profilometer was used to generate a three dimension height map of the sample surface. A 1602×1602 array of height values were obtained with a 30 µm spacing resulting in a 48 mm MD×48 mm CD field of view having a vertical resolution 100 nm and a lateral resolution 6 µm. The resulting height map was exported to .sdf (surface data file) format.

Individual sample .sdf files were analyzed using Nanovea® Ultra version 6.2 by performing the following functions:

(1) Using the "Thresholding" function of the Nanovea® Ultra software the raw image (also referred to as the field) is subjected to thresholding by setting the material ratio values at 0.5 to 99.5 percent such that thresholding truncates the measured heights to between the 0.5 percentile height and the 99.5 percentile height;

(2) Using the "Fill In Non-Measured Points" function of the Nanovea® Ultra software the non-measured points are filled by a smooth shape calculated from neighboring points;

(3) Using "Filtering >Wavyness +Roughness" function of the Nanovea® Ultra software the field is spatially low pass filtered (waviness) by applying a Robust Gaussian Filter with a cutoff wavelength of 0.095 mm and selecting "manage end effects";

(4) Using the "Filtering–Wavyness+Roughness" function of the Nanovea® Ultra software the field is spatially high pass filtered (roughness) using a Robust Gaussian Filter with a cutoff wavelength of 0.5 mm and selecting "manage end effects";

(5) Using the "Parameter Tables" study function of the Nanovea® Ultra software ISO 25178

Values Sq (root mean square height, expressed in units of mm) and Sa (arithmetic mean height, expressed in units of mm) are calculated and reported;

(6) Using the "Abbott-Firestone Curve" study function of the Nanovea® Ultra software an Abbott-Firestone Curve is generated from which "interactive mode" is selected and a histogram of the measured heights is generated, from the histogram an S90 value (95 percentile height (c2) minus the 5 percentile height (c1), expressed in units of mm) is calculated.

Based upon the foregoing, three values, indicative of surface smoothness are reported—Sq, Sa and S90, which all have units of mm. The units have been converted to microns for use herein.

Tensile

Samples for tensile strength testing are prepared by cutting a 3" (76.2 mm)×5" (127 mm) long strip in either the machine direction (MD) or cross-machine direction (CD) orientation using a JDC Precision Sample Cutter (Thwing-Albert Instrument Company, Philadelphia, Pa., Model No. JDC 3-10, Ser. No. 37333). The instrument used for measuring tensile strengths is an MTS Systems Sintech 11S, Serial No. 6233. The data acquisition software is MTS TestWorks™ for Windows Ver. 4 (MTS Systems Corp., Research Triangle Park, N.C.). The load cell is selected from either a 50 or 100 Newton maximum, depending on the strength of the sample being tested, such that the majority of peak load values fall between 10 and 90 percent of the load cell's full scale value. The gauge length between jaws is 2±0.04 inches (50.8±1 mm). The jaws are operated using pneumatic-action and are rubber coated. The minimum grip face width is 3" (76.2 mm), and the approximate height of a jaw is 0.5 inches (12.7 mm). The crosshead speed is 10±0.4 inches/min (254±1 mm/min), and the break sensitivity is set at 65 percent. The sample is placed in the jaws of the instrument, centered both vertically and horizontally. The test is then started and ends when the specimen breaks. The peak load is recorded as either the "MD tensile strength" or the "CD tensile strength" of the specimen depending on the sample being tested. At least six (6) representative specimens are tested for each product, taken "as is," and the arithmetic average of all individual specimen tests is either the MD or CD tensile strength for the product.

Roll Firmness

Roll Firmness was measured using the Kershaw Test as described in detail in U.S. Pat. No. 6,077,590, which is incorporated herein by reference in a manner consistent with the present disclosure. The apparatus is available from Kershaw Instrumentation, Inc. (Swedesboro, NJ) and is known as a Model RDT-2002 Roll Density Tester.

EXAMPLES

Example 1

Base sheets were made using a through-air dried papermaking process commonly referred to as "uncreped through-air dried" ("UCTAD") and generally described in U.S. Pat. No. 5,607,551, the contents of which are incorporated herein in a manner consistent with the present disclosure. Base sheets with a target bone dry basis weight of about 44 grams per square meter (gsm) were produced. The base sheets were then converted and spirally wound into rolled tissue products.

In all cases the base sheets were produced from a furnish comprising northern softwood kraft and eucalyptus kraft using a layered headbox fed by three stock chests such that the webs having three layers (two outer layers and a middle layer) were formed. The two outer layers comprised eucalyptus (each layer comprising 30 percent weight by total weight of the web) and the middle layer comprised softwood and eucalyptus. The amount of softwood and eucalyptus kraft in the middle layer was maintained for all inventive samples—the middle layered comprised 29 percent (by total weight of the web) softwood and 11 percent (by total weight of the web) eucalyptus. Strength was controlled via the addition of starch and/or by refining the furnish as set forth in Table 6, below.

The tissue web was formed on a Voith Fabrics TissueForm V forming fabric, vacuum dewatered to approximately 25 percent consistency and then subjected to rush transfer when transferred to the transfer fabric. The transfer fabric was the fabric described as "Fred" in U.S. Pat. No. 7,611,607 (commercially available from Voith Fabrics, Appleton, Wis.).

Figure 8:
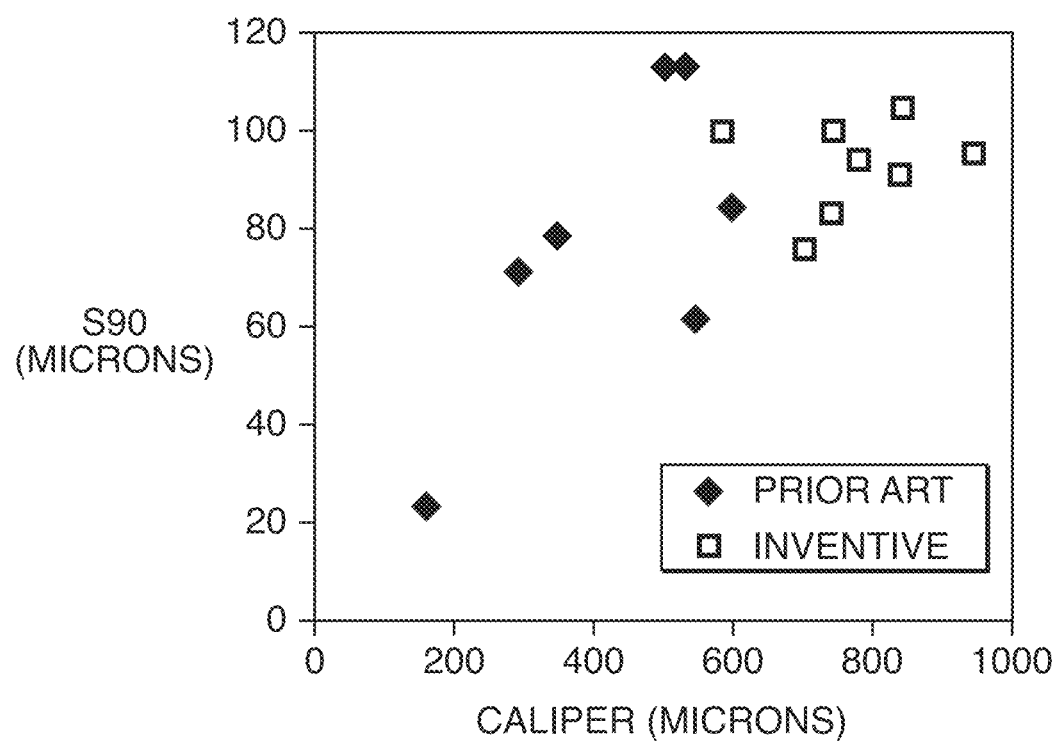
FIG. 8 is a graph comparing caliper (x-axis) and Surface Smoothness S90 (y-axis) for inventive and prior art tissue products.
Figure 9A:
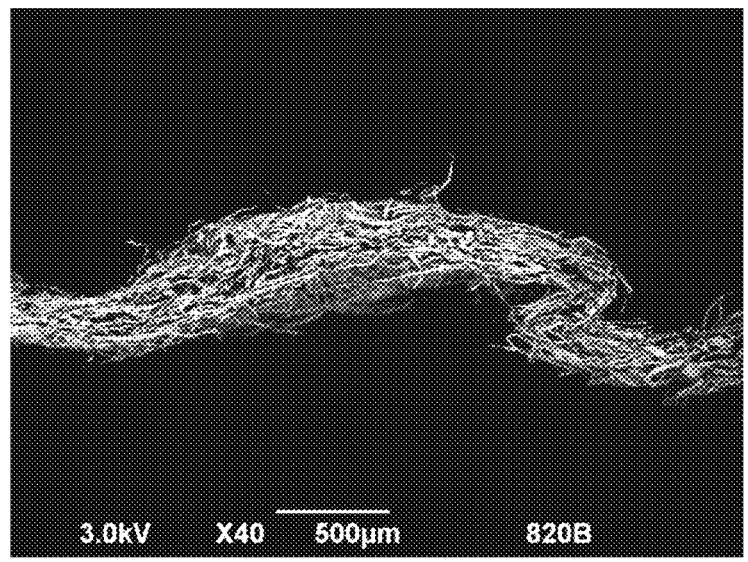
FIG. 9 is a side-by-side comparison of tissue web cross sections prepared using two different through-air drying fabrics a T-1205-2 fabric (9A) and the fabric illustrated in FIG. 10 (9B)
Figure 9B:
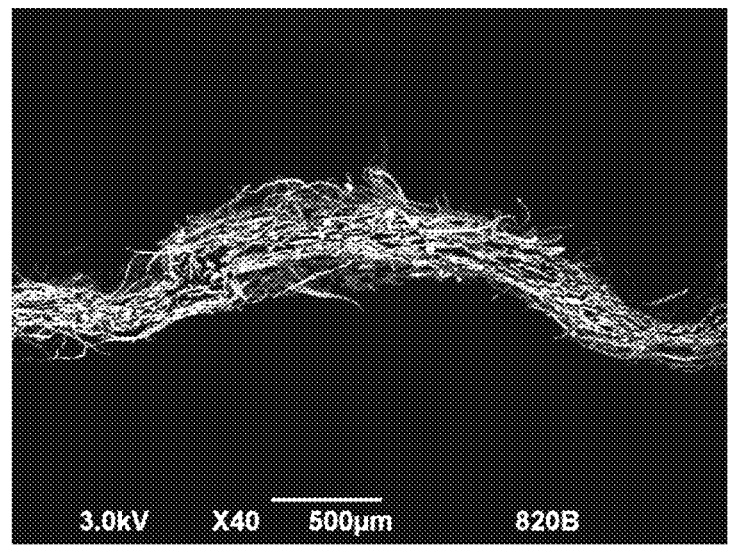
Figure 10:
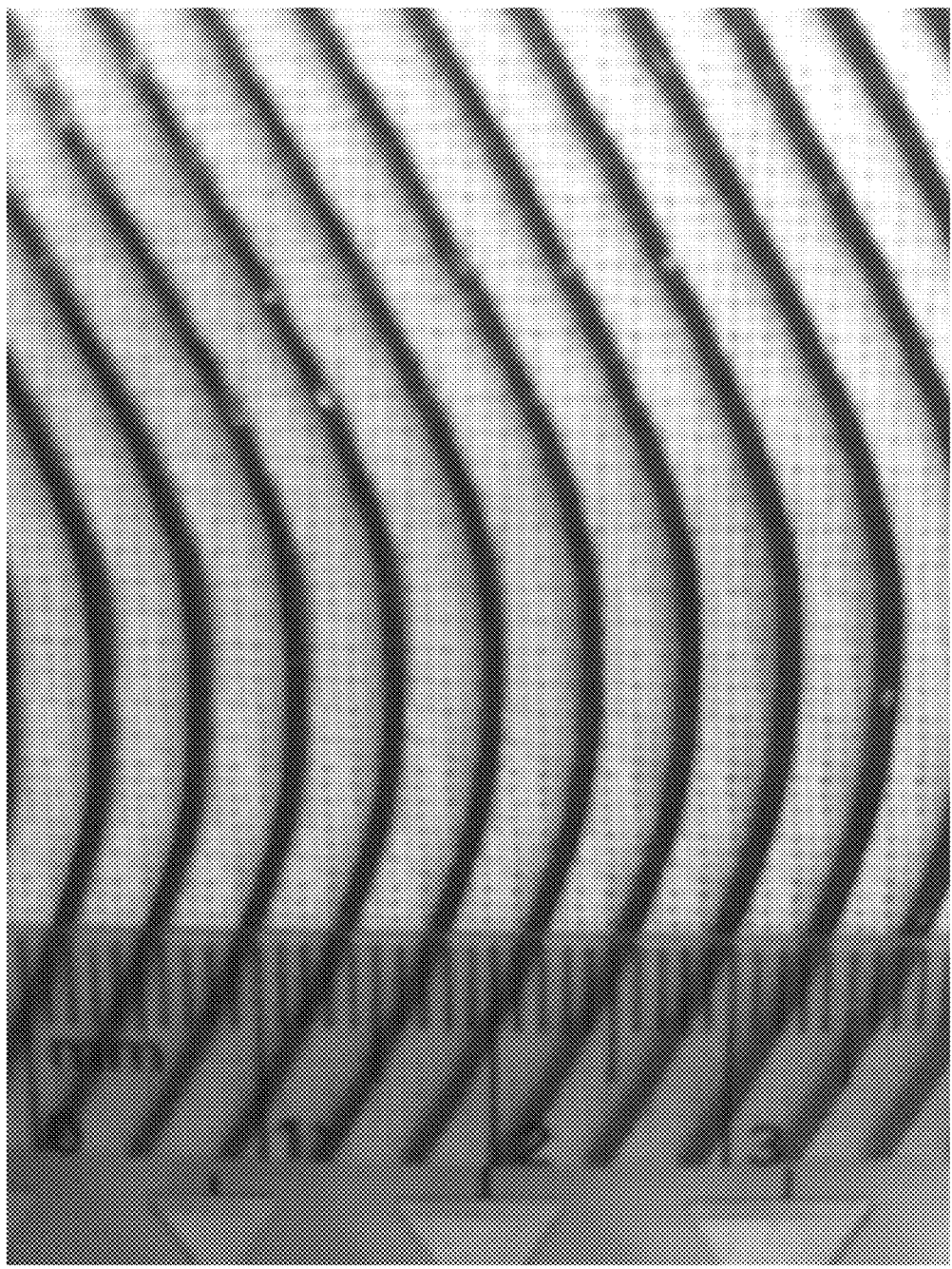
FIG. 10 is a photograph of a through-air drying fabric useful in forming tissue products according to one embodiment of the present disclosure.

The web was then transferred to a through-air drying fabric comprising a printed silicone pattern disposed on the sheet contacting side (hereinafter referred to as "Fozzie"). The silicone formed a wavelike pattern on the sheet contacting side of the fabric. The silicone pattern is illustrated in FIG. 8. The pattern properties are summarized in Table 5, below.

TABLE 5

| Pattern Height (mm) | Pattern Pitch (mm) | Pattern Wavelength (mm) | Pattern Amplitude (mm) |
|---|---|---|---|
| 0.9 | 4.1 | 100 | 20 |

Transfer to the through-drying fabric was done using vacuum levels of greater than 10 inches of mercury at the transfer. The web was then dried to approximately 98 percent solids before winding.

Table 6 shows the process conditions for each of the samples prepared in accordance with the present example. Table 7 summarizes the physical properties of the base sheet webs.

TABLE 6

| Sample | Refining (hpt/clay) | Starch (lbs/MT) | TAD Fabric | Rush Transfer (%) | Base Sheet Basis Weight (gsm) | Base Sheet GMT (g/3") |
|---|---|---|---|---|---|---|
| 1 | 0 | 0 | FOZZIE | 28 | 44.7 | 1041 |
| 2 | 3.4 | 0 | FOZZIE | 28 | 44.9 | 1374 |
| 3 | 5.5 | 0 | FOZZIE | 45 | 45.3 | 1032 |
| 4 | 2.4 | 0 | FOZZIE | 45 | 44.3 | 1296 |

TABLE 7

| Sample | Base Sheet Caliper (μm) | Base Sheet Bulk (cc/g) | Base Sheet MD Stretch (%) | Base Sheet CD Stretch (%) | Base Sheet GM Slope (g/3") | Base Sheet Stiffness Index |
|---|---|---|---|---|---|---|
| 1 | 1163 | 26.0 | 19.5 | 10.8 | 5940 | 5.70 |
| 2 | 1138 | 25.4 | 20.5 | 12.1 | 7168 | 5.22 |
| 3 | 1156 | 25.5 | 36.2 | 14.9 | 4376 | 4.24 |
| 4 | 1186 | 26.8 | 40.2 | 16.3 | 5734 | 4.42 |

The base sheet webs were converted into various bath tissue rolls. Specifically, base sheet was calendered using one or two conventional polyurethane/steel calenders comprising either a 4 or a 40 P&J polyurethane roll on the air side of the sheet and a standard steel roll on the fabric side. Process conditions for each sample are provided in Table 8, below. All rolled products comprised a single-ply of base sheet, such that rolled product sample Roll 1 comprised a single-ply of base sheet sample 1, Roll 2 comprised a single-ply of base sheet sample 2, and so forth.

TABLE 8

| Sample | 4 P & J Calender Load (pli) | 40 P & J Calender Load (pli) | Product Basis Wt. (gsm) | Product Sheet Caliper (μm) | Product Sheet Bulk (cc/g) | Roll Diameter (mm) | Roll Bulk (cc/g) | Roll Firmness (mm) |
|---|---|---|---|---|---|---|---|---|
| Roll 1 | 0 | 100 | 41.6 | 752 | 18.1 | 127.8 | 15.4 | 9.3 |
| Roll 2 | 0 | 120 | 42.0 | 742 | 17.7 | 127.4 | 15.1 | 8.8 |
| Roll 3 | 0 | 120 | 41.5 | 745 | 18.0 | 126.4 | 15.0 | 9.6 |
| Roll 4 | 0 | 120 | 41.0 | 752 | 18.3 | 126.6 | 15.3 | 9.2 |

TABLE 9

| Sample | Product GMT (g/3") | Product MD Stretch (%) | Product CD Stretch (%) | Product GM Slope (g/3") | Product Stiffness Index |
|---|---|---|---|---|---|
| Roll 1 | 805 | 16.2 | 8.6 | 5988 | 7.4 |
| Roll 2 | 996 | 17.4 | 9.5 | 6385 | 6.41 |
| Roll 3 | 793 | 30.3 | 11.4 | 3391 | 4.28 |
| Roll 4 | 978 | 31.0 | 12.2 | 3826 | 3.91 |

The finished products were subjected to Surface Smoothness analysis, as described in the Test Method section above. The results of the Surface Smoothness analysis are summarized in Table 10, below.

TABLE 10

| Sample | Sheet Bulk (cc/g) | GMT (g/3") | Sa (μm) | Sq (μm) | S90 (μm) |
|---|---|---|---|---|---|
| 2 | 17.7 | 996 | 18.5 | 29.2 | 83.4 |
| 3 | 18.0 | 793 | 21.7 | 35.0 | 100.0 |

Example 2

Additional inventive tissue base sheet was prepared substantially as described in Example 1 with the objective of increasing the basis weight of the single-ply tissue product and also producing a two-ply tissue product. Specifically, base sheet was prepared as described above using the process conditions set forth in Table 10, below. Base sheet was converted to one or two-ply rolled products by calendering using one or two conventional polyurethane/steel calenders comprising either a 4 or a 40 P&J polyurethane roll on the air side of the sheet and a standard steel roll on the fabric side. Process conditions for each sample are provided in Table 11, below. The calendered base sheet was converted into either one- or two-ply rolled tissue products. Two-ply rolled tissue products were formed by bringing two tissue webs into facing arrangement with one another and spray laminating to join the webs. The webs were not embossed or subject to other treatments. The rolled products were formed such that Roll 5 comprised two plies of Sample web 5, and so on.

Table 11 shows the process conditions for each of the samples prepared in accordance with the present example. Table 12 summarizes the physical properties of the resulting tissue product.

TABLE 11

| Sample | Refining (hpt/day) | Starch (lbs/MT) | TAD Fabric | Rush Transfer (%) | 4 P & J Calender Load (pli) | 40 P & J Calender Load (pli) | Plies |
|---|---|---|---|---|---|---|---|
| 5 | 0 | 4 | FOZZIE | 28 | 0 | 0 | 1 |
| 6 | 0 | 4 | FOZZIE | 28 | 0 | 10 | 1 |
| 7 | 0 | 4 | FOZZIE | 28 | 0 | 20 | 1 |
| 8 | 0 | 8 | FOZZIE | 28 | 30 | 90 | 2 |
| 9 | 0 | 8 | FOZZIE | 28 | 0 | 50 | 2 |
| 10 | 0 | 7 | FOZZIE | 28 | 30 | 90 | 2 |

TABLE 12

| Sample | Product Basis Wt. (gsm) | Product Sheet Caliper (μm) | Product Sheet Bulk (cc/g) | Product GMT (g/3") | Product GM Stretch (%) | Product GM Slope (g/3") | Product Stiffness Index | Roll Bulk (cc/g) | Roll Firmness (mm) |
|---|---|---|---|---|---|---|---|---|---|
| Roll 5 | 43.9 | 782 | 17.8 | 927 | 12.1 | 5814 | 6.3 | 14.6 | 9.3 |
| Roll 6 | 45.3 | 946 | 20.9 | 934 | 13.4 | 6063 | 6.5 | 16.4 | 5.1 |
| Roll 7 | 44.1 | 841 | 19.1 | 913 | 12.5 | 5923 | 6.5 | 15.3 | 7.6 |
| Roll 8 | 41.5 | 583 | 14.1 | 850 | 11.1 | 6429 | 7.6 | 14.5 | 9.7 |
| Roll 9 | 42.1 | 703 | 16.7 | 922 | 12.0 | 6229 | 6.8 | 16.4 | 8.8 |
| Roll 10 | 42.0 | 841 | 20.0 | 976 | 9.9 | 8973 | 9.2 | 14.0 | 9.1 |

The finished products were subjected to Surface Smoothness analysis, as described in the Test Method section above. The results of the Surface Smoothness analysis are summarized in Table 13, below.

TABLE 13

| Sample | Sheet Bulk (cc/g) | GMT (g/3") | Sa (μm) | Sq (μm) | S90 (μm) |
|---|---|---|---|---|---|
| 5 | 17.8 | 927 | 20.7 | 33.6 | 94.8 |
| 6 | 20.9 | 934 | 23.0 | 37.9 | 105.0 |
| 7 | 19.1 | 913 | 21.9 | 34.9 | 100.0 |
| 8 | 14.1 | 850 | 16.7 | 25.8 | 76.0 |
| 9 | 16.7 | 922 | 19.5 | 30.7 | 90.8 |
| 10 | 20.0 | 976 | 17.8 | 28.1 | 83.2 |

Example 3

Additional inventive tissue base sheet was prepared substantially as described in Example 1 with the objective of increasing the basis weight of the single-ply tissue product. Specifically, base sheet was prepared as described above using the process conditions set forth in Table 14, below. Base sheet was converted to one-ply rolled products by calendering using one or two conventional polyurethane/steel calenders comprising either a 4 or a 40 P&J polyurethane roll on the air side of the sheet and a standard steel roll on the fabric side as indicated in the table below and converted into single-ply rolled tissue products.

TABLE 14

| Sample | Refining (hpt/day) | Starch (lbs/MT) | TAD Fabric | Rush Transfer (%) | 4 P & J Calendar Load (pli) | 40 P & J Calendar Load (pli) | Plies |
|---|---|---|---|---|---|---|---|
| 11 | 2.25 | 1.06 | FOZZIE | 28 | 0 | 75 | 1 |

TABLE 15

| Sample | Basesheet Basis Weight (gsm) | Basesheet GMT (g/3") | Basesheet Caliper (um) | Basesheet MD Stretch (%) | Basesheet CD Stretch (%) | Basesheet GM Slope (gf) |
|---|---|---|---|---|---|---|
| 11 | 52.33 | 1108 | 1161 | 23.07 | 13.2 | 7387 |

TABLE 16

| Sample | Product Basis Wt. (gsm) | Product Sheet Caliper (μm) | Product Sheet Bulk (cc/g) | Product GMT (g/3") | Product GM Stretch (%) | Product GM Slope (g/3") | Product Stiffness Index | Roll Bulk (cc/g) | Roll Firmness (mm) |
|---|---|---|---|---|---|---|---|---|---|
| Roll 11 | 49.2 | 700 | 14.2 | 857 | 11.4 | 6631 | 7.7 | 12.96 | 8.4 |

The finished products were subjected to Surface Smoothness analysis, as described in the Test Method section above. The results of the Surface Smoothness analysis are summarized in Table 17, below.

TABLE 17

| Sample | Sheet Bulk (cc/g) | GMT (g/3") | Sa (μm) | Sq (μm) | S90 (μm) |
|---|---|---|---|---|---|
| 11 | 14.2 | 857 | 19.4 | 30.6 | 85.7 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present disclosure should be assessed as that of the appended claims and any equivalents thereto.

We claim:

1. A rolled tissue product comprising a tissue web spirally wound into a roll, the web having a three-dimensional surface topography comprising a plurality of alternating valleys and ridges, the center of adjacent ridges spaced apart from one another at least about 1.7 mm, a basis weight from about 35 to about 50 gsm, a sheet bulk from about 12 to about 20 cc/g and a Surface Smoothness S90 value from about 70 to about 120 μm.

2. The tissue product of claim 1 wherein the tissue web comprises an uncreped through-air dried web.

3. The tissue product of claim 1 wherein the tissue web has a Stiffness Index from about 6 to about 8 and a GMT from about 700 to about 1400 g/3".

4. The tissue product of claim 1 wherein the tissue web has a GM Slope from about 4,000 to about 8,000 g/3".

5. The rolled tissue product of claim 1 wherein the tissue web has a GMS from about 14 to about 18 percent.

6. The rolled tissue product of claim 1 wherein the tissue web is a single-ply through-air dried tissue web.

7. The rolled tissue product of claim 1 wherein the tissue web has a Surface Smoothness S90 value less than about 105 μm.

8. The rolled tissue product of claim 1 wherein the tissue web has a Surface Smoothness S90 value from about 70 to about 105 μm, a Surface Smoothness Sa value less than about 22 μm and a Surface Smoothness Sq value less than about 35 μm.

* * * * *